US010932992B2

(12) United States Patent
Wilson

(10) Patent No.: US 10,932,992 B2
(45) Date of Patent: Mar. 2, 2021

(54) APPARATUS FOR HOLDING BABY BOTTLES

(71) Applicant: Betta Goods, LLC, Carlsbad, CA (US)

(72) Inventor: David Wilson, Carlsbad, CA (US)

(73) Assignee: Betta Goods, LLC, Carlsbad, CA (US)

( * ) Notice: Subject to any disclaimer, the term of this patent is extended or adjusted under 35 U.S.C. 154(b) by 0 days.

(21) Appl. No.: 16/264,502

(22) Filed: Jan. 31, 2019

(65) Prior Publication Data

US 2019/0231646 A1 Aug. 1, 2019

Related U.S. Application Data

(60) Provisional application No. 62/624,340, filed on Jan. 31, 2018.

(51) Int. Cl.
*A61J 9/00* (2006.01)
*A61J 9/06* (2006.01)
*B29C 45/00* (2006.01)
*B29K 83/00* (2006.01)

(52) U.S. Cl.
CPC ........... *A61J 9/0669* (2015.05); *A61J 9/0638* (2015.05); *B29C 45/0001* (2013.01); *B29K 2083/00* (2013.01)

(58) Field of Classification Search
CPC .... A61J 9/0638; A61J 9/08; A61J 9/04; A61J 11/04
USPC ...................... 248/102, 103, 104, 105, 311.3
See application file for complete search history.

(56) References Cited

U.S. PATENT DOCUMENTS

| 1,886,619 | A | | 11/1932 | Arnone | |
|---|---|---|---|---|---|
| 2,348,816 | A | * | 5/1944 | Hyams | A61J 9/0684 248/106 |
| 2,526,121 | A | | 10/1950 | Curry et al. | |
| 3,946,451 | A | | 3/1976 | Spann | |
| 4,895,327 | A | | 1/1990 | Malone et al. | |
| D336,005 | S | * | 6/1993 | Keup | D7/313 |
| D361,131 | S | * | 8/1995 | Leopold | D24/199 |
| D363,549 | S | * | 10/1995 | Ye | D24/199 |
| D379,660 | S | | 6/1997 | Aube | |
| 5,979,843 | A | | 11/1999 | Beck | |
| 6,055,667 | A | | 5/2000 | Jimenez | |
| 6,082,681 | A | * | 7/2000 | Rand | A61J 9/06 248/102 |
| 6,098,934 | A | | 8/2000 | Skelton | |
| D439,671 | S | * | 3/2001 | Casillo | D24/199 |
| 6,592,084 | B1 | | 7/2003 | Nile | |
| 6,923,332 | B1 | * | 8/2005 | Thomas | A61J 9/00 215/11.1 |
| 6,961,961 | B1 | | 11/2005 | Ezra | |
| 8,281,435 | B2 | * | 10/2012 | Kent | A47D 13/08 248/102 |
| 10,258,544 | B2 | * | 4/2019 | Kim | A63H 3/003 |

(Continued)

*Primary Examiner* — Steven M Marsh
(74) *Attorney, Agent, or Firm* — Beau B. Horner

(57) ABSTRACT

An apparatus is utilized to position and hold a baby bottle on a chest and/or stomach of an infant. Apparatus includes a body having a front section, a first sidewall, a second sidewall opposite the first sidewall, and a bottom section. A channel positioned within the body and extending through the front section is utilized for receiving a baby bottle. The channel is positioned at an angle in relation to the bottom section in order to properly position the baby bottle in relation to an infant's mouth.

15 Claims, 15 Drawing Sheets

(56) References Cited

U.S. PATENT DOCUMENTS

| | | |
|---|---|---|
| 2005/0029411 A1 | 2/2005 | Cannon |
| 2005/0103954 A1 | 5/2005 | Touma |
| 2006/0102810 A1 | 5/2006 | Banks |
| 2008/0290225 A1* | 11/2008 | Mostert ................. A61J 9/0676 248/102 |

* cited by examiner

US 10,932,992 B2

1

APPARATUS FOR HOLDING BABY BOTTLES

CROSS-REFERENCE TO RELATED APPLICATIONS

This application claims priority to Provisional Patent Application No. 62/624,340, filed Jan. 31, 2018, which is hereby incorporated by reference in its entirety.

FIELD OF THE INVENTION

The disclosure relates generally to bottle holders, and more specifically to bottle holders that position baby bottles in a specific position.

BACKGROUND OF THE INVENTION

An infant typically lacks the ability to feed itself with a bottle, as it lacks the appropriate dexterity. So in order to feed an infant, an adult is needed to hold the bottle in a proper position so that the baby can feed. Over the course of the feeding, the adult's muscles may get tired or the adult may need to do other activities other than feeding the infant. If an adult needs to perform an activity that does not involve feeding the infant, it would be unrealistic for the infant to properly hold the bottle for itself while the adult is performing that other activity.

Solutions/devices created to solve this problem are typically inefficient, as they rely on the infant to hold their own bottle in place, are made of permeable materials that soil easily, or are cumbersome to use and are not easily portable. A solution/device to solve this problem would be easy to use, highly portable, dishwasher safe, sturdy (stays in place), and doesn't require an infant to hold any part of an infant's bottle.

BRIEF SUMMARY OF THE INVENTION

The disclosed subject matter provides an apparatus for holding a baby bottle in a specific position. The apparatus may comprise a body including a front section, a first sidewall, a second sidewall opposite the first sidewall, and a bottom section. A channel may be positioned within the body for receiving the baby bottle. The channel may extend through the front section and may be positioned at an angle in relation to the bottom section so that the bottle may be properly positioned for an infant's mouth when the apparatus is positioned on an infant's chest and/or stomach.

The apparatus may further include an opening that may provide malleability to the apparatus when a baby bottle is placed within the channel. When the baby bottle is placed in channel, the weight of the baby bottle may cause the first edge and the second edge to bow inward toward baby bottle. The first edge and second edge may contact baby bottle and create friction between the bowed first and second edges and the baby bottle when the bowed first and second edges contact baby bottle.

A method for positioning a baby bottle for an infant is disclosed. The method may include positioning the baby bottle in a channel of the baby bottle holding apparatus positioned on at least one of a chest and a belly of an infant. The channel may be positioned at an angle in relation to a bottom section of the baby bottle holding apparatus.

A method for producing a baby bottle holding apparatus is disclosed. The method may include providing a mold for the baby bottle holding apparatus. Silicone may then be injected into the mold. Once the baby bottle holding apparatus is molded, the molded baby bottle holding apparatus may be removed from the mold.

These details together with other objects of the disclosure are pointed out with particularity in the claims annexed to and forming a part of this disclosure. For a better understanding of the disclosure, its operating advantages and the specific objects attained by its uses, reference should be had to the accompanying drawings and descriptive matter. The foregoing has outlined some of the more pertinent objects of this disclosure. These objects should be construed to be merely illustrative of some of the more prominent features and applications of the present disclosure. Many other beneficial results can be attained by applying the present disclosure in a different manner or by modifying the disclosure within the scope of the disclosure. Accordingly, other objects and a fuller understanding of the disclosure may be had by referring to the summary of the invention and the detailed description of the preferred embodiment in addition to the scope of the disclosure defined by the claims taken in conjunction with the accompanying drawings.

BRIEF DESCRIPTION OF THE DRAWINGS

The novel features believed characteristic of the disclosed subject matter will be set forth in any claims that are filed. The disclosed subject matter itself, however, further objectives, and advantages thereof, will best be understood by reference to the following detailed description of an illustrative embodiment when read in conjunction with the accompanying drawings, wherein:

DETAILED DESCRIPTION OF ILLUSTRATIVE EMBODIMENTS

Reference now should be made to the drawings, in which the same reference numbers are used throughout the different figures to designate the same components.

It will be understood that, although the terms first, second, third, etc. may be used herein to describe various elements, these elements should not be limited by these terms. These terms are only used to distinguish one element from another element. Thus, a first element discussed below could be termed a second element without departing from the teachings of the present disclosure.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising" or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Figure 1:
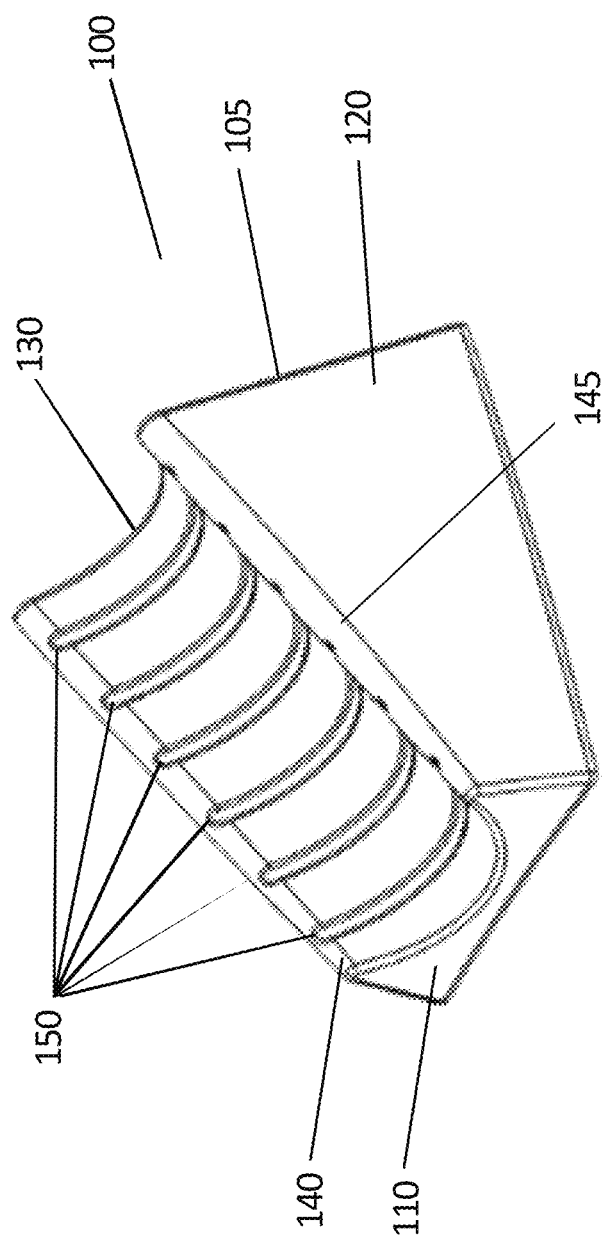
FIG. 1 displays a perspective view of an apparatus for holding a baby bottle in accordance with embodiments.
Figure 2:
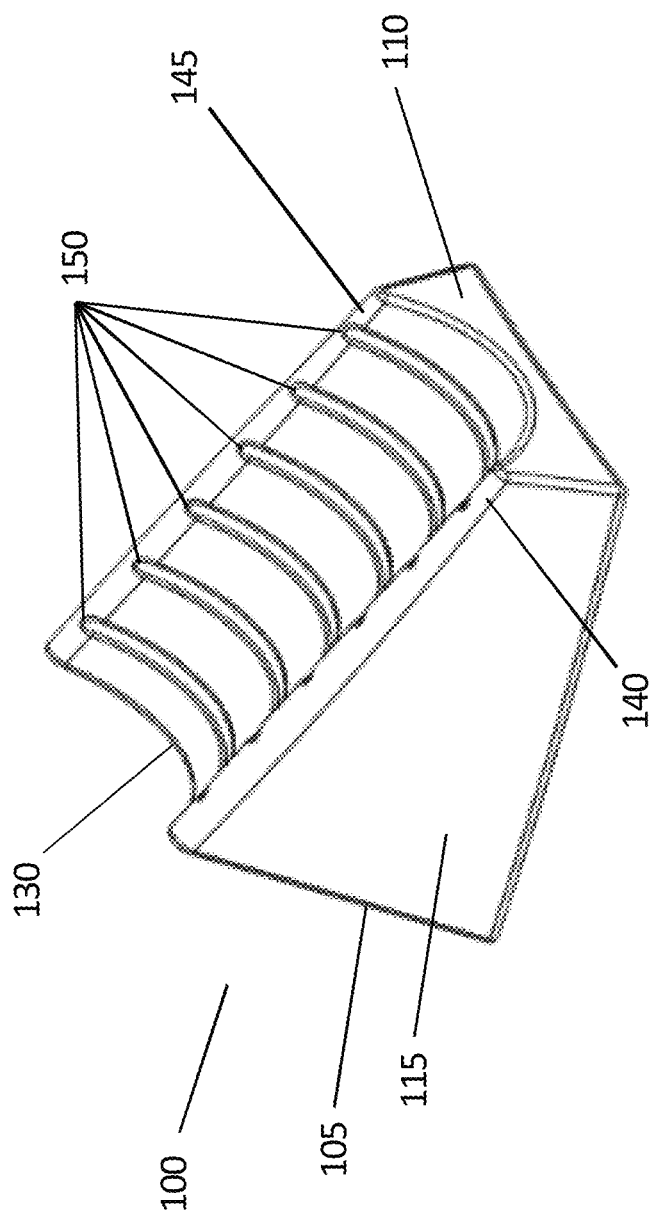
FIG. 2 displays a perspective view of an apparatus for holding a baby bottle in accordance with embodiments.

FIGS. 1 and 2 display perspective views of an apparatus 100 for holding and positioning a baby bottle (not depicted) in accordance with embodiments. Apparatus 100 may properly position a baby bottle on a chest and/or stomach of an infant without the help of the infant or an adult (may act as a hands-free feeding device). Apparatus 100 may comprise a body 105 including a front section 110, a first sidewall 115 (see FIG. 2), a second sidewall 120 opposite the first sidewall 115, and a bottom section 125 (see FIG. 3).

A channel 130 may be positioned within body 105 for receiving a baby bottle. Channel 130 may extend through front section 110 so that when apparatus 100 is positioned on the infant's chest and/or stomach while the baby bottle is placed in channel 130, the baby bottle may extend out of the channel 130 in order to be accessible to the infant's mouth. Additionally, channel 130 may be positioned at an angle in relation to bottom section 125.

Apparatus 100 may further include a first edge 140 and a second edge 145 formed at intersections between the first sidewall 115 and the second sidewall 120 with opposite sides of channel 130. It is at these edges 140,145 that at least one groove 150 extends within channel 130 between first edge 140 and second edge 145 (see FIGS. 1, 2, and 3). Grooves 150 may increase the traction between apparatus 100 and a baby bottle when a baby bottle is placed in channel 130.

Figure 3:
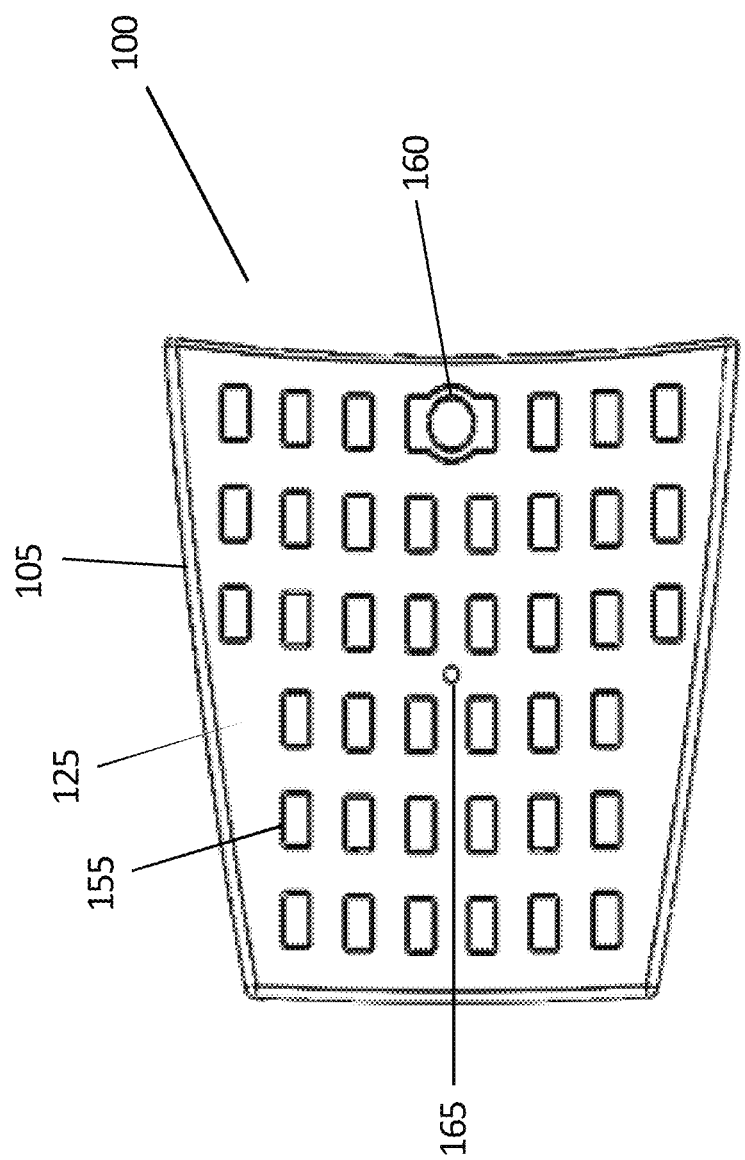
FIG. 3 displays a bottom view of an apparatus for holding a baby bottle in accordance with embodiments.

FIG. 3 displays a bottom view of an apparatus 100 for holding a baby bottle in accordance with embodiments. Apparatus 100 may comprise at least one protrusion 155 affixed to bottom section 125. The at least one protrusion 155 may provide traction to apparatus 100 when apparatus 100 is placed on the chest/stomach of an infant. As shown, the at least one protrusion 155 is rectangular in shape, but in other embodiments the at least one protrusion 155 may be any shape other than rectangles as well.

In embodiments, bottom section 125 may comprise a first aperture 160. The first aperture 160 may extend through the bottom section 125 and may provide one or more benefits, such as, but not limited to allowing apparatus 100 to be hung up and stored (on a nail, screw, etc.) and providing ventilation when apparatus 100 needs to be dried. In embodiments, first aperture 160 may be integrated within a single protrusion 155, such as that shown in FIG. 3.

In embodiments, bottom section 125 may comprise a second aperture 165. The second aperture 165 may extend through the bottom section 125 and acts as an outlet for air when opening 135 or when opening 135 and first aperture 160 are covered (may be used to prevent suffocation by an infant).

Figure 4:
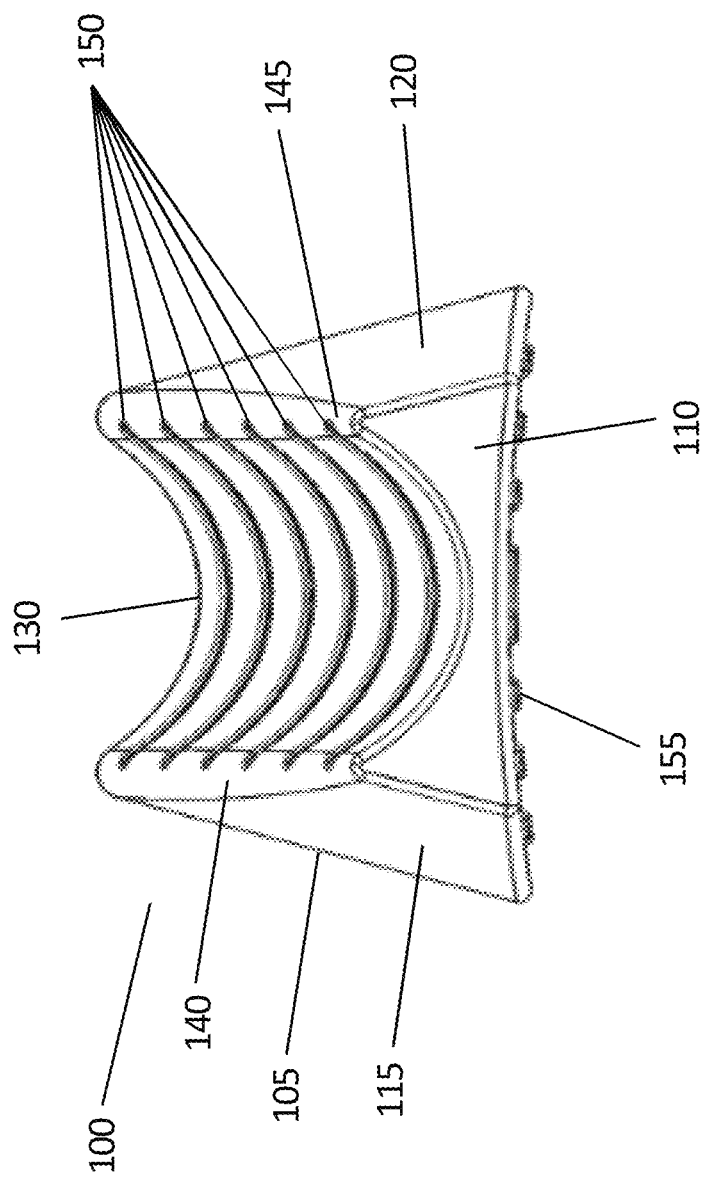
FIG. 4 displays a front view of an apparatus for holding a baby bottle in accordance with embodiments.

FIG. 4 displays a front view of an apparatus 100 for holding a baby bottle in accordance with embodiments. Channel 130 is shown extending from front section 110 to opening 135. This may allow apparatus 100 to hold baby bottles with multiple lengths and may allow a baby bottle to be placed within apparatus 100 at different positions along channel 130 so that the bottle is properly positioned for an infant to drink from the bottle.

As further shown in FIG. 4, apparatus 100 may include a bottom section 125 that may comprise a concave shape (having an apex in the middle of apparatus 100). The concave shape may allow for apparatus 100 to be comfortably positioned on an infant's chest and/or stomach.

Figure 5:
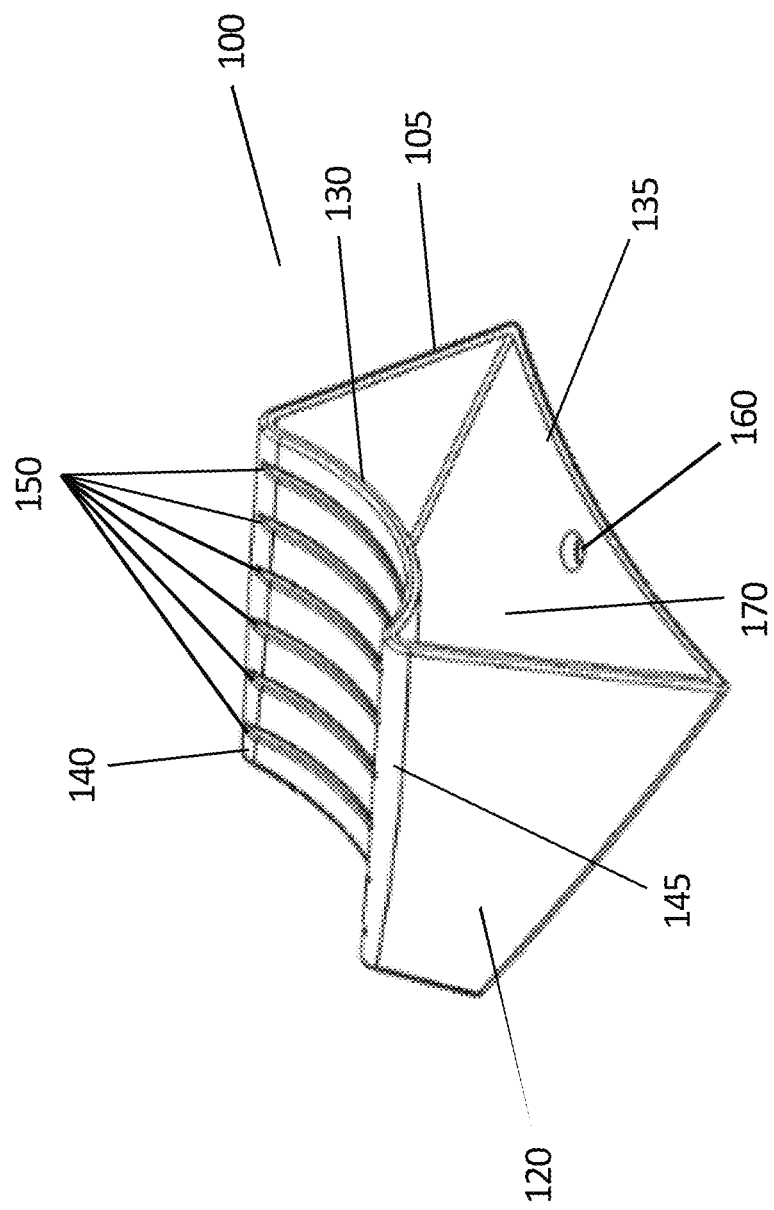
FIG. 5 displays a rear perspective view of an apparatus for holding a baby bottle in accordance with embodiments.

FIG. 5 displays a rear perspective view of an apparatus 100 for holding a baby bottle in accordance with embodiments. An opening 135 may be positioned opposite the front section 110. Opening 135 may be defined by the edges of front section 110, first sidewall 115, second sidewall 120, and bottom section 125. When baby bottle is placed within channel 130, opening 135 may provide malleability to apparatus 100 by allowing apparatus 100 to bend inward on itself. When apparatus 100 is bent inward, friction may be applied to a baby bottle positioned within channel 130.

It is noted that apparatus 100 may comprise a hollow interior section 170. The hollow interior section 170 may allow apparatus 100 to be more easily packaged for shipping and/or storage purposes.

Figure 6:
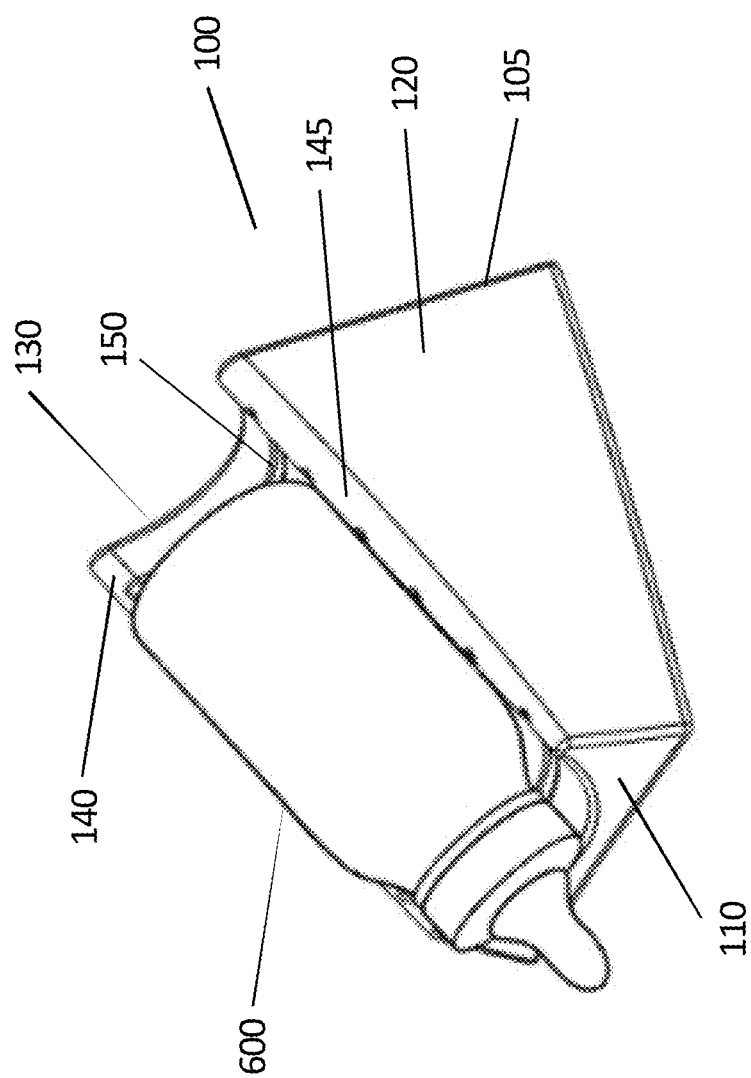
FIG. 6 displays a perspective view of an apparatus for holding a baby bottle with the apparatus holding a baby bottle in accordance with embodiments.

FIG. 6 displays a perspective view of an apparatus for holding a baby bottle 600 with the apparatus 100 holding a baby bottle 600 in accordance with embodiments. Baby bottle 600 is depicted being positioned within channel 130. Opening 135 of apparatus 100 may provide malleability to apparatus 100 when baby bottle 600 is placed within channel 130. When the baby bottle 600 is placed in channel 130, the weight of the baby bottle 600 may cause the first edge 140 and the second edge 145 to bow inward toward baby bottle 600. The first edge 140 and second edge 145 may contact baby bottle 600 and create friction between the bowed first and second edges 140,145 and the baby bottle 600 when the bowed first and second edges 140,145 contact baby bottle 600.

Figure 7:
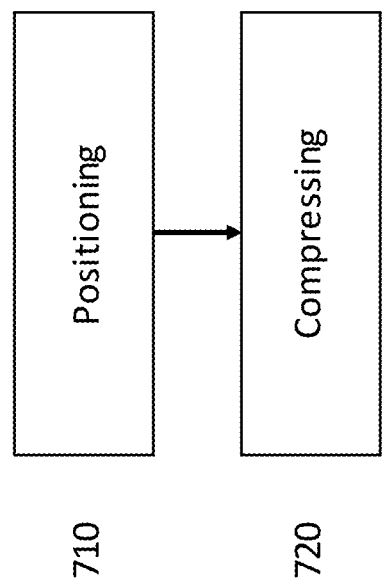
FIG. 7 displays a method for positioning a baby bottle for an infant in accordance with embodiments.

FIG. 7 displays a method 700 for positioning a baby bottle for an infant in accordance with embodiments. Method 700 may comprise positioning 710 the baby bottle in a channel 130 of a baby bottle holding apparatus 100 positioned on at least one of a chest and a belly of an infant. Channel 130 may be positioned at an angle in relation to a bottom section 125 of the baby bottle holding apparatus 100. When baby bottle is placed in channel 130, apparatus 100 may be compressed 720 during positioning of baby bottle within channel 130. It is during this compressing 720 that the first edge 140 and the second edge 145 may bow inward toward baby bottle due to the weight of the baby bottle.

Figure 8:
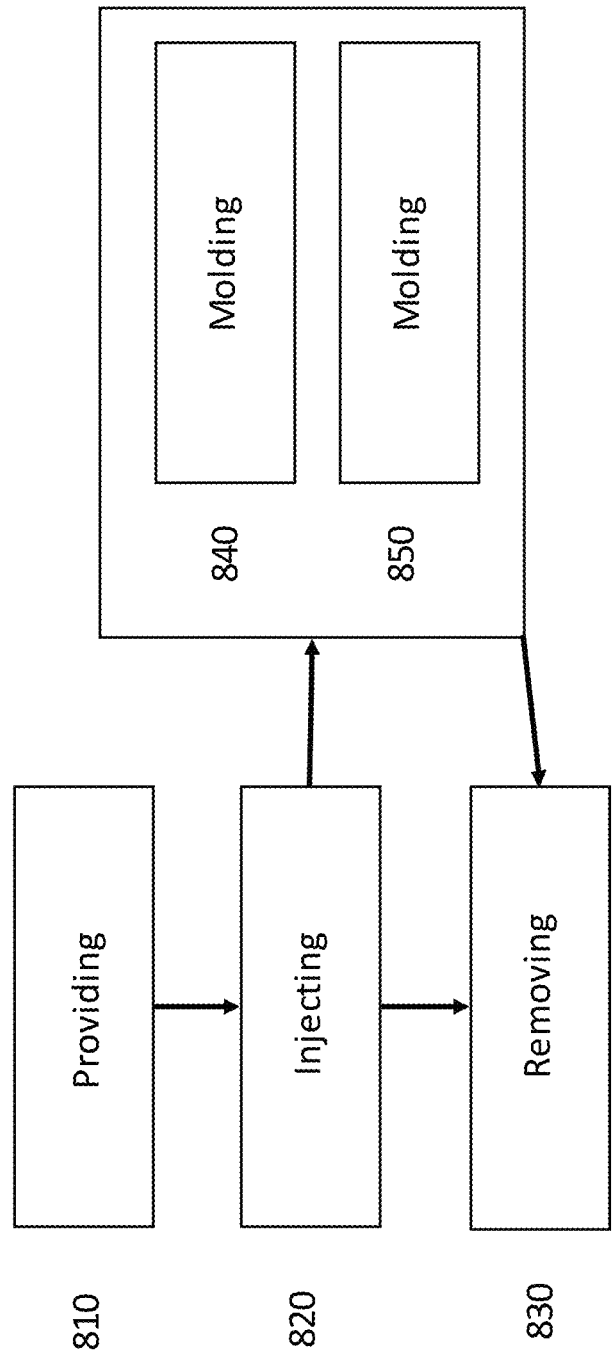
FIG. 8 displays a method for producing a baby bottle holding apparatus in accordance with embodiments.

FIG. 8 displays a method 800 for producing a baby bottle holding apparatus 100 in accordance with embodiments. Method 800 comprises providing 810 a mold for the baby bottle holding apparatus 100. Silicone may then be injected 820 into the mold. Once the baby bottle holding apparatus 100 is molded, the molded baby bottle holding apparatus 100 may be removed 830 from the mold. It is noted that baby bottle holding apparatus 100 may comprise any of the details, features, and/or elements disclosed in this application.

In embodiments, method 800 may further comprise molding 840 a hollow interior section 170 into the baby bottle holding apparatus 100. The hollow interior section 170 may allow apparatus 100 to be more easily packaged for shipping and/or storage purposes.

In embodiments, method 800 may further comprise molding 850 the bottom section 125 to have a concave shape (having an apex in the middle of apparatus 100). The concave shape may allow for apparatus 100 to be comfortably positioned on an infant's chest and/or stomach.

Figure 9:
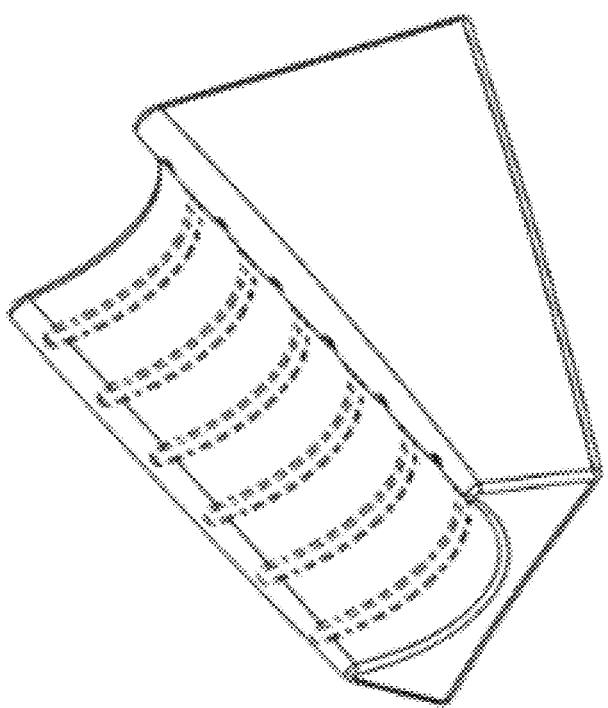
FIG. 9 is a perspective view of a baby bottle holder.
Figure 10:
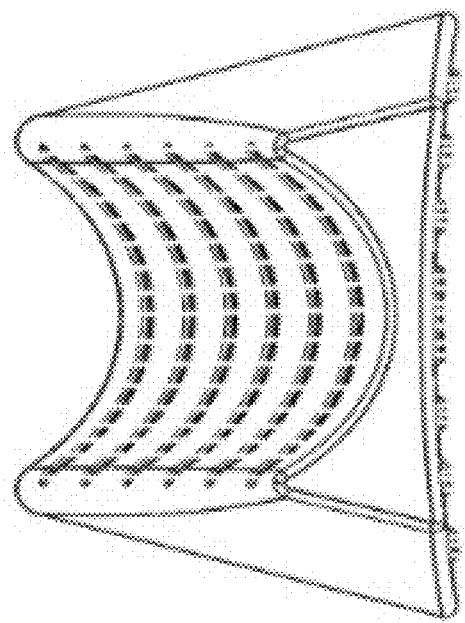
FIG. 10 is a front view of a baby bottle holder.
Figure 11:
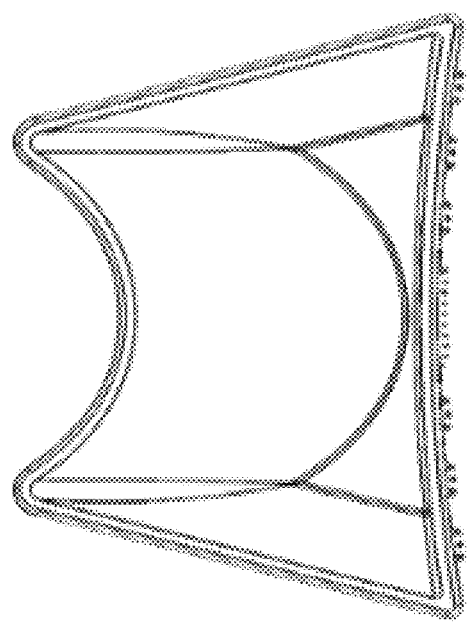
FIG. 11 is a rear view of a baby bottle holder.
Figure 12:
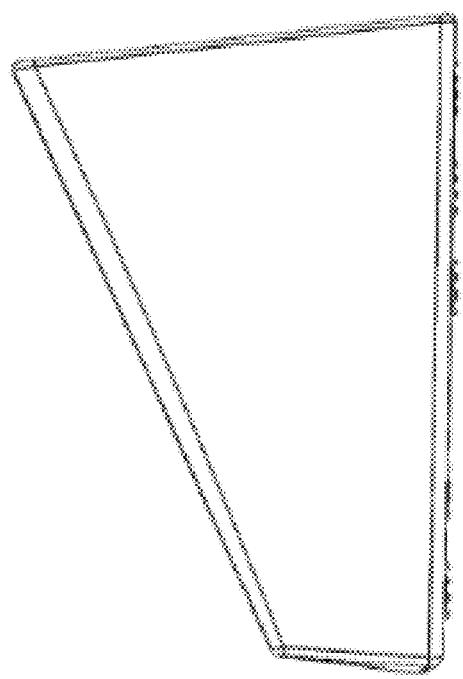
FIG. 12 is a side view of a baby bottle holder.
Figure 13:
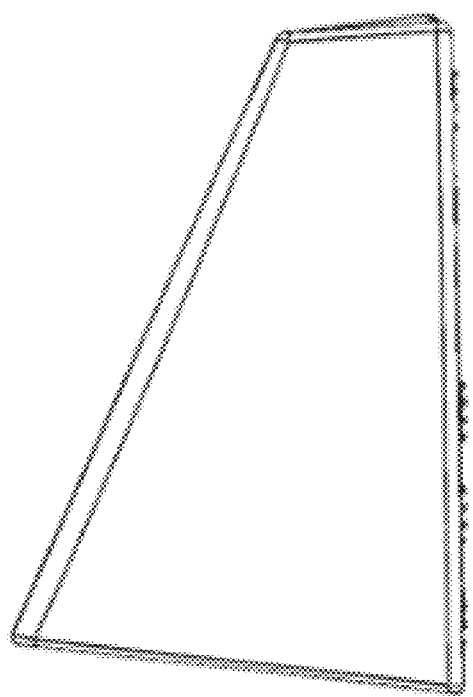
FIG. 13 is an additional side view of a baby bottle holder.
Figure 14:
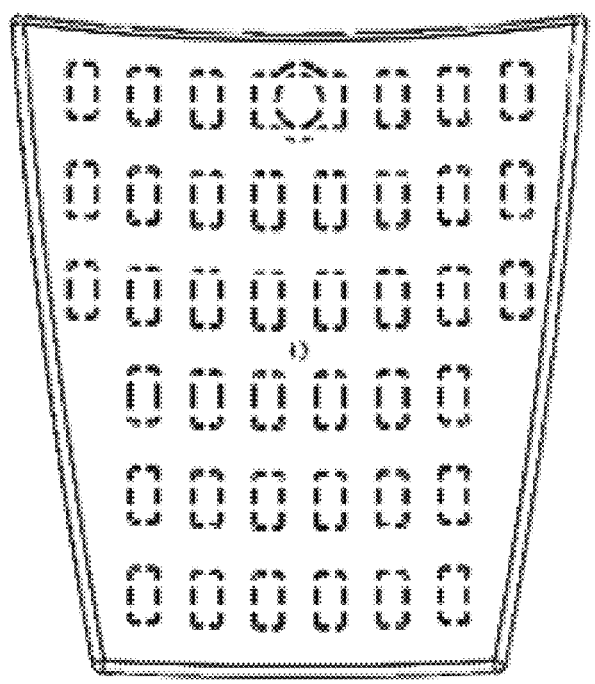
FIG. 14 is a bottom view of a baby bottle holder.
Figure 15:
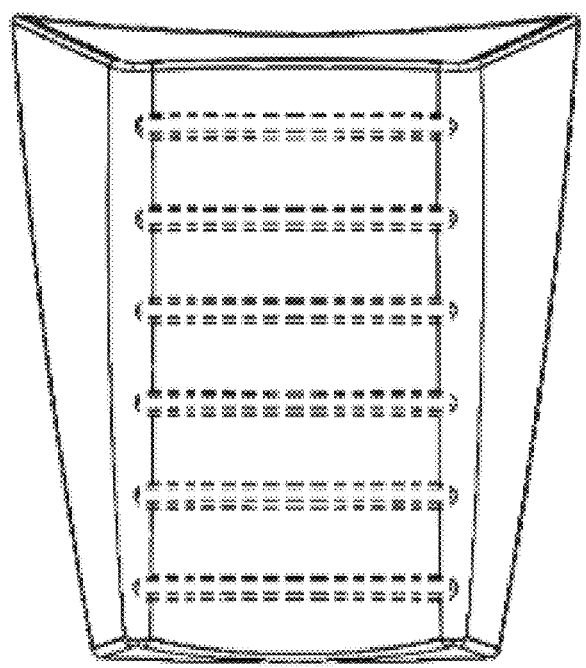
FIG. 15 is a top view of a baby bottle holder.

FIG. 9 is a perspective view of a baby bottle holder.
FIG. 10 is a front view of a baby bottle holder.
FIG. 11 is a rear view of a baby bottle holder.
FIG. 12 is a side view of a baby bottle holder.
FIG. 13 is an additional side view of a baby bottle holder.
FIG. 14 is a bottom view of a baby bottle holder.
FIG. 15 is a top view of a baby bottle holder.

It is noted that dotted lines shown in FIGS. 9-15 denote unclaimed subject matter in terms of patentability for design purposes. For example, unclaimed subject matter may include subject matter correlating to grooves 150, at least one protrusion 155, a first aperture 160, and a second aperture 165.

In embodiments, apparatus 100 may comprise silicone. Silicone may increase traction for apparatus 100 and may allow apparatus 100 to be easily formed via injection molding.

In embodiments, apparatus 100 may comprise one or more malleable polymers other than silicone.

It is noted that baby bottle may refer to not only baby bottles, but may be inclusive of other baby/toddler bottles and cups such as, but not limited to sippy cups.

For the purposes of this disclosure, the terms "apparatus", "baby bottle holder", and "baby bottle holding apparatus" may be synonymous.

Unless otherwise defined, all technical and scientific terms used herein have the same meanings as are commonly understood by one of ordinary skill in the art to which this disclosure belongs. Although methods similar or equivalent to those described herein can be used in the practice or testing of the present disclosure, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present disclosure is not limited to what has been particularly shown and described hereinabove. Rather, the scope of the present disclosure is defined by the appended claims and includes both combinations and sub-combinations of the various features described hereinabove as well as variations and modifications thereof, which would occur to persons skilled in the art upon reading the foregoing description.

The invention claimed is:

1. An apparatus for holding a baby bottle, comprising:
a body comprising:
    a front section;
    a first sidewall;
    a second sidewall opposite the first sidewall;
    a bottom section;
    a hollow interior section; and
    a channel positioned within the body for receiving the baby bottle, the channel extending through the front section and positioned at an angle in relation to the bottom section, the channel forming a first edge and a second edge at intersections between opposite sides of the channel and the first sidewall and the second sidewall; and
an opening opposite the front section and defined by the channel, the first sidewall, the second sidewall and the bottom section;
wherein the weight of the baby bottle pushes the channel into the hollow interior section and causes the first edge and the second edge to bow inward and contact the baby bottle to provide friction and stability to the baby bottle when the baby bottle is placed in the channel.

2. The apparatus of claim 1, wherein the apparatus comprises silicone.

3. The apparatus of claim 1, wherein the opening provides malleability to the apparatus when the baby bottle is placed within the channel.

4. The apparatus of claim 1, wherein the channel extends through the front section and to the opening, further wherein the depth of the channel is consistent from the front section to the opening.

5. The apparatus of claim 1, wherein the hollow interior section is defined by the front section, the first sidewall, the second sidewall, the bottom section, and the channel.

6. The apparatus of claim 1, wherein the channel comprises at least one groove extending across the channel.

7. The apparatus of claim 1, further comprising at least one protrusion affixed to the bottom section, the at least one protrusion providing traction to the apparatus when the apparatus is placed unaffixed on at least one of a chest and a stomach of an infant.

8. The apparatus of claim 1, further comprising a first aperture extending through the bottom section.

9. The apparatus of claim 1, further comprising a second aperture extending through the bottom section.

10. The apparatus of claim 1, wherein the bottom section comprises a concave shape.

11. A method for positioning a baby bottle for an infant, comprising:
positioning the baby bottle in a channel of a baby bottle holding apparatus positioned on at least one of a chest and a belly of an infant;
wherein the apparatus comprises an opening opposite a front section and defined by the channel, a first sidewall, a second sidewall, and a bottom section, the channel forming a first edge and a second edge at intersections between opposite sides of the channel and the first sidewall and the second sidewall, the channel positioned at an angle in relation to the bottom section of the baby bottle holding apparatus;
wherein the weight of the baby bottle pushes the channel into a hollow interior section and causes the first edge and the second edge to bow inward and contact the baby bottle to provide friction and stability to the baby bottle when the baby bottle is placed in the channel.

12. The method of claim 11, wherein the baby bottle holding apparatus is compressed during the positioning.

13. A method for producing a baby bottle holding apparatus, the method comprising:
providing a mold for the baby bottle holding apparatus;
injecting silicone into the mold;
molding a hollow interior section into the baby bottle holding apparatus;
removing the molded baby bottle holding apparatus from the mold;
wherein the baby bottle holding apparatus produced in the mold comprises:
    a body comprising:
    a front section;
    a first sidewall;
    a second sidewall opposite the first sidewall;
    a bottom section;
    a hollow interior section; and a channel positioned within the body for receiving a baby bottle, the channel extending through the front section, the channel positioned at an angle in relation to the bottom section;

wherein the channel forms a first edge and a second edge at intersections between opposite sides of the channel and the first sidewall and the second sidewall;

wherein the weight of the baby bottle pushes the channel into the hollow interior section and causes the first edge and the second edge to bow inward and contact the baby bottle to provide friction and stability to the baby bottle when the baby bottle is placed in the channel.

14. The method of claim 13, further comprising molding the bottom section to have a concave shape.

15. The method of claim 13, wherein the baby bottle holding apparatus further comprises an opening opposite the front section.

\* \* \* \* \*